United States Patent
Momtaz

(10) Patent No.: US 11,225,574 B2
(45) Date of Patent: Jan. 18, 2022

(54) POLYMER COMPOSITIONS INCLUDING A POLY(ETHER SULFONE) BLEND AND ARTICLES MADE THEREFROM

(71) Applicant: SOLVAY SPECIALTY POLYMERS USA, LLC, Alpharetta, GA (US)

(72) Inventor: Maryam Momtaz, Alpharetta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 15/780,194

(22) PCT Filed: Nov. 25, 2016

(86) PCT No.: PCT/EP2016/078859
§ 371 (c)(1),
(2) Date: May 30, 2018

(87) PCT Pub. No.: WO2017/093139
PCT Pub. Date: Jun. 8, 2017

(65) Prior Publication Data
US 2018/0355174 A1 Dec. 13, 2018

Related U.S. Application Data

(60) Provisional application No. 62/261,549, filed on Dec. 1, 2015.

(51) Int. Cl.

| | |
|---|---|
| *C08L 81/06* | (2006.01) |
| *C08G 65/00* | (2006.01) |
| *C08G 75/20* | (2016.01) |
| *C08G 75/00* | (2006.01) |
| *C08G 75/10* | (2006.01) |
| *C08L 71/00* | (2006.01) |
| *C08G 65/40* | (2006.01) |
| *C08G 75/23* | (2006.01) |
| *C08L 71/02* | (2006.01) |
| *C08G 65/20* | (2006.01) |
| *A47J 36/02* | (2006.01) |

(52) U.S. Cl.
CPC ............ *C08L 81/06* (2013.01); *A47J 36/025* (2013.01); *C08G 65/00* (2013.01); *C08G 65/20* (2013.01); *C08G 65/40* (2013.01); *C08G 75/00* (2013.01); *C08G 75/10* (2013.01); *C08G 75/20* (2013.01); *C08G 75/23* (2013.01); *C08L 71/00* (2013.01); *C08L 71/02* (2013.01); *C08L 2205/025* (2013.01)

(58) Field of Classification Search
CPC ................. C08L 81/06; C08J 3/09; C08J 5/18
USPC ........................................................ 523/100
See application file for complete search history.

(56) References Cited

U.S. PATENT DOCUMENTS

| | | | |
|---|---|---|---|
| 4,503,168 A | 3/1985 | Hartsing, Jr. | |
| 5,086,130 A | 2/1992 | Dickinson et al. | |
| 5,746,961 A * | 5/1998 | Stevenson | B05D 7/02 106/218 |
| 7,932,310 B2 * | 4/2011 | Gallucci | C08L 81/06 428/411.1 |
| 8,501,291 B2 * | 8/2013 | Davis | C08G 73/1046 428/35.7 |
| 2005/0228149 A1 | 10/2005 | Trivedi et al. | |
| 2007/0066765 A1 * | 3/2007 | Aneja | C08L 79/08 525/437 |
| 2008/0044682 A1 * | 2/2008 | Chan | C08J 5/18 428/626 |
| 2008/0255309 A1 * | 10/2008 | Weinberg | C08G 75/20 525/148 |
| 2009/0026128 A1 * | 1/2009 | Underwood | C08J 5/18 210/483 |
| 2011/0294912 A1 | 12/2011 | Weber et al. | |
| 2012/0308777 A1 * | 12/2012 | Davis | C08L 79/08 428/156 |
| 2018/0134849 A1 * | 5/2018 | Momtaz | C08L 81/00 |
| 2019/0054429 A1 * | 2/2019 | Di Nicolo' | B01D 71/68 |

FOREIGN PATENT DOCUMENTS

| | | |
|---|---|---|
| EP | 2738219 A1 | 6/2014 |
| JP | H04-227659 A | 8/1992 |
| WO | 06037753 A1 | 4/2006 |

OTHER PUBLICATIONS

Standard ASTM D3418, "Standard Test Method for Transition Temperatures and Enthalpies of Fusion and Crystallization of Polymers by Differential Scanning Calorimetry", 2008, p. 1-7.

* cited by examiner

*Primary Examiner* — Jane L Stanley
(74) *Attorney, Agent, or Firm* — Beatrice C. Ortego

(57) ABSTRACT

Described herein are polymer compositions having a poly (ether sulfone) polymer and (i) a polysulfone polymer or (ii) a poly(phenyl sulfone) polymer. In some embodiments, the polymer compositions can optionally include one or more additives. It has been surprisingly found that the aforementioned polymer compositions have outstanding anti-stick properties with respect to proteins.

17 Claims, No Drawings

POLYMER COMPOSITIONS INCLUDING A POLY(ETHER SULFONE) BLEND AND ARTICLES MADE THEREFROM

CROSS-REFERENCE TO RELATED APPLICATIONS

This application claims priority to U.S. Provisional Application No. 62/261,549, filed Dec. 1, 2015, and to European Application No. EP 16157651.7, filed Feb. 26, 2016, the whole content of each of these applications being incorporated herein by reference for all purposes.

TECHNICAL FIELD

The present invention relates to a polymer composition comprising a poly(ether sulfone) polymer blend. The invention further relates to an anti-stick surface including the poly(ether sulfone) polymer blend.

BACKGROUND

Undesirable adhesion of proteins to plastic surfaces is prevalent in a variety of application settings. Furthermore, the problem of protein adhesion can be exacerbated when the protein and plastic surface are in contact at elevated temperatures (e.g. greater than about 80° C.). For example, in food application settings, containers and utensils such as tableware, cookware, storage containers, and dishware that come into contact with food at relatively high temperatures during cooking, or while serving may become soiled with various substances. In some instances, the container/utensil cannot be desirably cleaned due to the adhesion between the residual food and the container/utensil. Furthermore, repeated use can further exacerbate soiling and lead to a reduced service life of a container/utensil.

As another example, in medical applications, undesirably concentrations of proteins in the body (e.g., blood, blood plasma, and blood serum) can adhere to the surface of articles such as implants and tubes that are implanted in the body. Additionally, the surface of articles such as sterilization trays and fluid filter membranes which are used external to the body but come into contact with bodily fluids containing proteins can also be susceptible to undesirable amounts of protein adhesion.

Typical methods of reducing adhesion of proteins to plastic surfaces include reducing or preventing contact between the protein and the material surface. Fluoropolymers, in particular polytetrafluoroethylene, are well known for their anti-stick properties. However these polymers are generally laminated or coated as a thin film on a surface and, therefore, are subject to adhesion of protein residues and the resistance to scratches and wear of the articles thus obtained can be unsatisfactory. Other known methods for reducing food sticking include, but are not limited to, the use of silicone derivatives in polymer compositions.

The problem of providing articles having desirable anti-stick properties with respect to proteins, while maintaining desirable mechanical and thermal resistance, is at present still unmet.

SUMMARY

In a first aspect, the invention relates to an article (A) including a surface (S) configured to contact a protein, the surface (S) containing a polymer composition (C) including component (a): from about 50 wt. % to about 98.5 wt. % of a poly(ether sulfone) ("PES") polymer (M1). The polymer composition (C) further includes component (b): from about 1.0 wt. % to about 40 wt. % of a polysulfone ("PSU") polymer (M2); or from about 1 wt. % to about 40 wt. % of a poly(phenyl ether sulfone) ("PPSU") polymer (M3); or from about 1 wt. % to about 40 wt. % of a mixture of (M2) and (M3). The polymer composition (C) optionally comprises from about 1 wt. % to about 40 wt. % of at least one clay mineral filler (F). All the amounts are relative to the total weight of the polymer composition. If the polymer composition (C) includes from about 1 wt. % to about 7 wt. %, preferably from about 1 wt. % to about 5 wt. % PPSU polymer (M3), the clay mineral filler (F) is present at at least about 7 wt. %, preferably at least about 10 wt. %.

In some embodiments, the mineral filler (F) is selected among kaolin and/or mica.

In some embodiments, the polymer composition (C) is free of a polysulfone polymer.

In some embodiments, the polymer composition (C) includes from about 67 wt. % to about 95 wt. %, preferably from about 75 wt. % to about 90 wt. %, of component (a) and/or from about 5 wt. % to about 10 wt. % of component (b). In some embodiments, the polymer composition (C) includes about 75 wt. % to about 90 wt. % of component (a), from about 3 wt. % to about 10 wt. % of (M2) or (M3) as component (b), from about 5 wt. % to about 8 wt. % of titanium dioxide, and optionally from about 5 wt. % to about 30 wt. % of kaolin and/or mica, as filler (F).

In some embodiments, the surface (S) comprises a substrate and a film or coating having an average thickness from about 25 μm to about 1 mm disposed on the substrate and wherein the film or coating comprises the polymer composition (C). In some embodiments, the article (A) is selected from the group consisting of a food container, a food utensil and a medical article. In additional or alternative embodiments, the article (A) is selected from the group consisting of a food service tray, a plate, a bowl, a cup, a food storage container, a pot, a pan, a mixing bowl, a casserole dish, a knife, a fork, a spoon, a cooking utensil, a serving utensil and any combination thereof. In some such embodiments, a food service tray having a plurality of food containers, at least one of the plurality of food containers is the aforementioned article (A).

In some embodiments, the article (A) is selected from an implantable cordiverter defibrillator, an artificial hip joint, an artificial knee joint, a heart pacemaker, a breast implant, an artificial spinal disc, an intra-uterine device, an artificial knees, a coronary stent, an ear tube, a prosthesis, an artificial heart valve, a catheter, a hemodialysis membrane, a forceps, a clamp, a retractor, a distractor, a scalpel, a surgical scissor, a dilator, a specula, a suction tip, a stapler, an injection needle, a drill, a fiber optic instruments, and a sterilization tray.

In some embodiments, a method for reducing sticking between the article (A) and a protein can include forming at least a portion of the surface (S) from the polymer composition (C). In some embodiments, a process for the preparation of the article (A) can include preparing the polymer composition (C) by blending components (a) and (b), and optionally the clay mineral filler (F), and optionally other ingredients, and forming the surface (S) comprising the polymer composition (C) or coating or laminating at least a surface of the article (A) with polymer composition (C) to form surface (S).

In some embodiments, the PES polymer (M1) has a glass transition temperature of at least about 200° C., preferably at least about 210° C., more preferably at least about 220° C., as measured by differential scanning calorimetry according to the ASTM D3418 standard.

In a second aspect, the invention relates to a polymer composition (C) comprising component (a): from about 50 wt. % to about 98.5 wt. % of a poly(ether sulfone) ("PES") polymer (M1), for example from about 60 wt. % to about 98.5 wt. %. The polymer composition (C) also comprises component (b): from about 1 wt. % to about 40 wt. % of a polysulfone ("PSU") polymer (M2), for example from about 1.0 wt. % to about 20 wt. % of a polysulfone ("PSU") polymer (M2); or more than about 1 wt. % to about 40 wt. % of a poly(phenyl ether sulfone) ("PPSU") polymer (M3); or more than about 1 wt. % to about 40 wt. % of a mixture of (M2) and (M3). The polymer composition (C) optionally comprises from about 1 wt. % to about 40 wt. % of at least one clay mineral filler (F). All the amounts are relative to the total weight of the polymer composition. If the polymer composition (C) comprises from about 1 wt. % to about 7 wt. %, preferably from about 1 wt. % to about 5 wt. % of PPSU polymer (M3), the clay mineral filler (F) is present at at least about 7 wt. %, preferably at least about 10 wt. %.

In some embodiments, the PES polymer (M1) includes at least 50 mol. % of recurring units ($R_{PES}$) of formula:

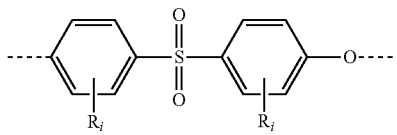

Where:
each $R_i$, equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium, and each i, equal to or different from each other, is an integer ranging from 0 to 4. In some embodiments, each i=0.

In some embodiments, the PSU polymer (M2) includes at least 50 mol. % of recurring units ($R_{PSU}$) of formula:

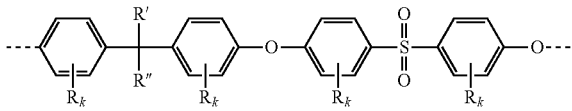

wherein (i) each $R_k$, equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; (ii) R' and R", equal to or different from each other, is selected from a hydrogen, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and (iii) each k, equal to or different from each other, is an integer ranging from 0 to 4. In some embodiments, each k=0. In additional or alternative embodiments, R' and R" are a methyl group.

In some embodiments, the PPSU polymer (M3) includes at least 50 mol. % recurring unit ($R_{PPSU}$) of formula:

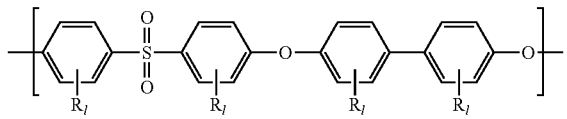

wherein (i) each $R_l$, equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and (ii) each l, equal to or different from each other, is an integer ranging from 0 to 4. In some such embodiments, each l=0.

In some embodiments, the mineral filler (F) is kaolin and/or mica.

In some embodiments, the polymer composition (C) is free of a polysulfone polymer (M2) or comprise a polysulfone polymer (M2) in an amount not exceeding 2 wt. % or 1 wt. %.

In some embodiments, the polymer composition (C) includes from about 67 wt. % to about 95 wt. %, preferably from about 75 wt. % to about 90 wt. %, of component (a) and/or from about 5 wt. % to about 10 wt. % of component (b). In some embodiments, the polymer composition (C) includes about 75 wt. % to about 90 wt. % of component (a), from about 3 wt. % to about 10 wt. % of (M2) or (M3) as component (b), from about 5 wt. % to about 8 wt. % of titanium dioxide, and optionally from about 5 wt. % to about 30 wt. % of kaolin and/or mica, as filler (F).

In some embodiments, an article (A) including a surface (S) configured to contact a protein, the surface (S) comprising the polymer composition (C). In some such embodiments, the surface (S) includes a substrate and a film or coating having an average thickness from about 25 μm to about 1 mm disposed on the substrate and wherein the film or coating comprises the polymer composition (C). In some embodiments, the article (A) is selected from the group consisting of a food container, a food utensil and a medical article. In some embodiments, the article (A) is selected from the group consisting of a food service tray, a plate, a bowl, a cup, a food storage container, a pot, a pan, a mixing bowl, a casserole dish, a knife, a fork, a spoon, a cooking utensil, a serving utensil and any combination thereof. In some such embodiments, a food service tray having a plurality of food containers, at least one of the plurality of food containers can be the aforementioned article (A).

In some embodiments, the article (A) is selected from an implantable cordiverter defibrillator, an artificial hip joint, an artificial knee joint, a heart pacemaker, a breast implant, an artificial spinal disc, an intra-uterine device, an artificial knees, a coronary stent, an ear tube, a prosthesis, an artificial heart valve, a catheter, a hemodialysis membrane, a forceps, a clamp, a retractor, a distractor, a scalpel, a surgical scissor, a dilator, a specula, a suction tip, a stapler, an injection needle, a drill, a fiber optic instruments, and a sterilization tray.

In some embodiments, a method for reducing sticking between the article (A) and a protein can include forming at least a portion of the surface (S) from the polymer composition (C). In some embodiments, a process for the preparation of the article (A) can include preparing the polymer composition (C) by blending components (a) and (b), and optionally the clay mineral filler (F) and optionally other ingredients, and forming the surface (S) comprising the polymer composition (C) or coating or laminating at least a surface of the article (A) with polymer composition (C) to form surface (S).

In some embodiments, the PES polymer (M1) has a glass transition temperature of at least about 200° C., preferably at least about 210° C., more preferably at least about 220° C., as measured by differential scanning calorimetry according to the ASTM D3418 standard.

DETAILED DESCRIPTION

Described herein a polymer compositions having a poly (ether sulfone) ("PES") polymer and (i) a polysulfone ("PSU") polymer or (ii) a poly(phenyl sulfone) ("PPSU") polymer. In some embodiments, the polymer compositions can optionally include one or more additives. It has been surprisingly found that the aforementioned polymer compositions have outstanding anti-stick properties with respect to proteins. In particular, proteins can adhere to plastic surfaces through chemical bonds ranging from relatively weak van der Waals forces to relative strong covalent bonds. In one aspect, the polymer compositions can be desirably used to reduce adhesion between plastic and proteins in application settings in which proteins come into contact with the plastic surface of an article comprising the polymer composition.

The Poly(Ether Sulfone) Polymer (M1)

The polymer compositions comprise at least one poly (ether sulfone) ("PES") polymer (or PES polymer). A PES polymer refers to a polymer having at least 50 mol. % of recurring units ($R_{PES}$) of formula (I):

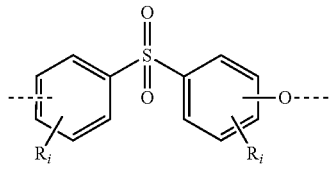
(I)

where (i) each $R_i$, equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium, and (ii) each i, equal to or different from each other, is an integer ranging from 0 to 4. For the sake of clarity, when i equals 0, the corresponding benzyl group is unsubstituted. Furthermore, as used herein, a dashed bond indicates a bond to an adjacent recurring unit. In some embodiments, the polymer composition can have at least 55 mol. %, at least 60 mol. %, at least 70 mol. %, at least 80 mol. %, at least 90 mol. %, at least 95 mol. %, at least 99 mol. %, or at least 99.9 mol. % recurring unit ($R_{PES}$). A person of ordinary skill in the art will recognize addition ($R_{PES}$) amount ranges within the explicitly disclosed ranges are contemplated and within the scope of the present disclosure.

In some embodiments, the poly(ether sulfone) ("PES") polymer has at least 50 mol. % of recurring units ($R_{PES}$) of formula (II):

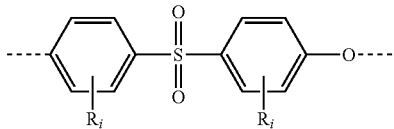
(II)

In some embodiments, the recurring units ($R_{PES}$) can be according to Formula (I) or (II) wherein each i=0.

According to the present invention, the poly(ether sulfone) ("PES") polymer can be a homopolymer or a copolymer. In embodiments in which the PES polymer is a copolymer, the poly(ether sulfone) ("PES") polymer comprises recurring units ($R_{PES}^*$), distinct from recurring units ($R_{PES}$), selected from the group consisting of formulas:

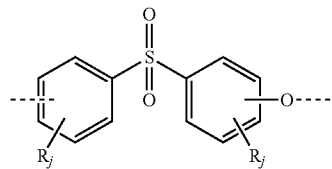
(III)

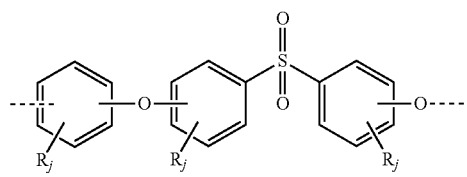
(IV)

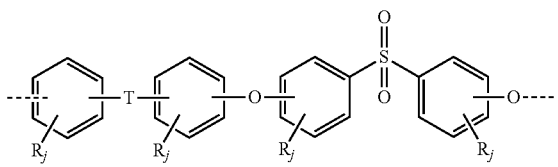
(V)

where each of $R_j$, equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;

each of j, equal to or different from each other, is an integer from 0 to 4; and T is selected from a bond, —$CH_2$—; —O—; —S—; —C(O)—; —$C(CH_3)_2$—; —$C(CF_3)_2$—; —$C(=CCl_2)$—; —$C(CH_3)(CH_2CH_2COOH)$—; —N=N—; —$R^aC=CR^b$—; where each $R^a$ and $R^b$; independently of one another, is a hydrogen or a $C_1$-$C_{12}$-alkyl, $C_1$-$C_{12}$-alkoxy, or $C_6$-$C_{18}$-aryl group; —$(CH_2)_q$— and —$(CF_2)_q$—, where q is an integer ranging from 1 to 6, or an aliphatic divalent group, linear or branched, of up to 6 carbon atoms; and mixtures thereof.

In some embodiments, the recurring units ($R_{PES}*$) are selected from the group consisting of:

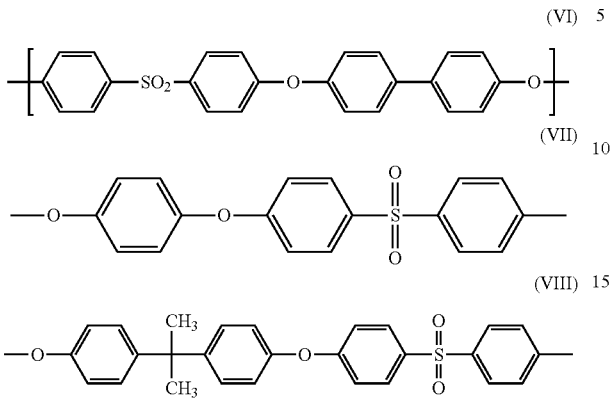

or mixtures thereof.

In some embodiments, in which the PES polymer is a copolymer, the PES can have at least about 1 mol. %, at least about 5 mol. %, or at least about 10 mol. % of recurring unit ($R_{PES}*$). In such embodiments, the PES polymer can have no more than about 50 mol. %, no more than about 40 mol. %, no more than about 30 mol. %, or no more than 20 mol. % of recurring unit ($R_{PES}*$). A person of ordinary skill in the art will recognize additional ranges within the explicitly disclosed ranges are contemplated and within the scope of the present disclosure.

The PES polymer can have a weight average molecular weight from about 20,000 grams/mole (g/mol) to about 100,000 g/mol or from about 40,000 g/mol to about 80,000 g/mol. A person of ordinary skill in the art will recognize that additional weight average molecular weight ranges within the explicitly disclosed ranges are contemplated and within the scope of the present disclosure. The weight average molecular weight can be determined as $$M_w = \frac{\Sigma M_i^2 \cdot N_i}{\Sigma M_i \cdot N_i}$$

where $M_i$ is the discrete value for the molecular weight of a polymer molecule in a sample and $N_i$ is the number of polymer molecules in the sample with molecular weight $M_i$. Weight average molecular weight can be measured by gel permeation chromatography using the ASTM D5296 standard.

The PES polymers of interest herein have a glass transition temperature ("$T_g$") of at least about 200° C., at least about 210° C., or at least about 220° C. The glass transition temperature can be measured using differential scanning calorimetry ("DSC") using a ramp rate of 20° C./minute according to the ASTM D3418 standard.

The polymeric compositions of the present invention comprise no more than about 98.5 weight percent ("wt. %"), for example no more than about 98 wt. % or no more than about 95 wt. % of the PES polymer. In such embodiments, the polymer compositions comprises at least about 50 wt. %, at least about 55 wt. %, at least about 60 wt. % or at least about 65 wt. % of the PES polymer. A person of ordinary skill in the art will recognize additional PES amount ranges within the explicitly disclosed ranges are contemplated and within the scope of the present disclosure.

The Polysulfone Polymer (M2)

The polymer compositions can optionally include at least one polysulfone ("PSU") polymer (or PSU polymer). As used herein, a PSU polymer refers to a polymer having at least 50 mol. % of the recurring unit ($R_{PSU}$) of formula (IX):

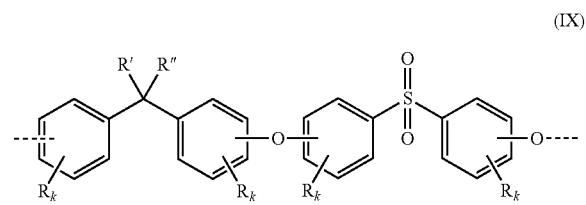

where (i) each $R_k$, equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; (ii) R' and R", equal to or different from each other, is selected from a hydrogen, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; (iii) each k, equal to or different from each other, is an integer ranging from 0 to 4. In some embodiments, the polymer composition can have at least 55 mol. %, at least 60 mol. %, at least 70 mol. %, at least 80 mol. %, at least 90 mol. %, at least 95 mol. %, at least 99 mol. %, or at least 99.9 mol. % recurring unit ($R_{PSU}$). A person of ordinary skill in the art will recognize addition ($R_{PSU}$) amount ranges within the explicitly disclosed ranges are contemplated and within the scope of the present disclosure.

In some embodiments, the recurring units ($R_{PSU}$) are according to formula (X):

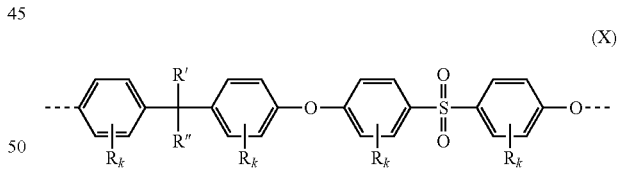

In some embodiments, the recurring units ($R_{PSU}$) of Formula (IX) or (X) wherein each k=0.

In some embodiments, the recurring units ($R_{PSU}$) are of Formula (IX) or (X), wherein R' and R" are a methyl group ($-CH_3$).

In some embodiments, the recurring units ($R_{PSU}$) are of Formula (IX) or (X), wherein R' and R" are a methyl group ($-CH_3$) and each k=0.

The PSU polymer of the present invention can be a homopolymer or a copolymer.

In some embodiments, the PSU polymer is a copolymer and further comprises recurring units ($R_{PSU}*$), distinct from recurring unit ($R_{PSU}$), for example represented by a formula selected from the group of formulas consisting of formulas (III) to (VIII).

In some embodiments, in which the PSU polymer is a copolymer, the PSU can have at least about 1 mol. %, at least about 5 mol. %, or at least about 10 mol. % recurring unit ($R_{PSU}$*). In such embodiments, the PSU polymer can have no more than about 50 mol. %, no more than about 40 mol. %, no more than about 30 mol. %, or no more than 20 mol. % of recurring unit ($R_{PSU}$*). A person of ordinary skill in the art will recognize additional ranges within the explicitly disclosed ranges are contemplated and within the scope of the present disclosure.

The PSU polymer can have a weight average molecular weight from about from about 20,000 g/mol to about 80,000 g/mol. A person of ordinary skill in the art will recognize that additional weight average molecular weight ranges within the explicitly disclosed ranges are contemplated and within the scope of the present disclosure.

In some embodiments where the polymer compositions includes a PSU polymer, it has been found that outstanding anti-stick properties are found when the PSU polymer is present in an amount of more than about 1 wt. %, at least 1.5 wt. % or at least 2 wt. %. In some embodiments, the PSU polymer amount is no more than about 40 wt. %, no more than about 35 wt. %, no more than about 30 wt. %, no more than about 20 wt. %, no more than about 15 wt. % or no more than about 10 wt. %. The polymer composition of the present invention for example from about 1 wt. % to about 20 wt. % of a polysulfone ("PSU") polymer (M2). A person of ordinary skill in the art will recognize additional PSU amount ranges within the explicitly disclosed ranges are contemplated and within the scope of the present disclosure.

The Poly(Phenyl Sulfone) Polymer (M3)

The polymer compositions can optionally include at least one poly(phenyl sulfone) ("PPSU") polymer (or PPSU polymer). As used herein, a PPSU polymer refers to a polymer having at least 50 mol. % of the recurring unit ($R_{PPSU}$) of formula (XI):

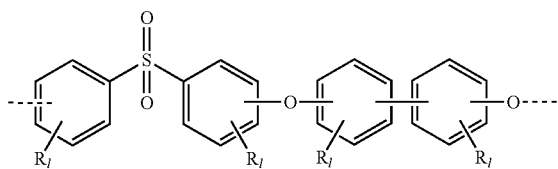

(XI)

where (i) each $R_I$, equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium, and (ii) each l, equal to or different from each other, is an integer ranging from 0 to 4. In some embodiments, the polymer composition can have at least 55 mol %, at least 60 mol %, at least 70 mol %, at least 80 mol %, at least 90 mol %, at least 95 mol %, at least 99 mol %, or at least 99.9 mol % recurring unit ($R_{PPSU}$). A person of ordinary skill in the art will recognize addition ($R_{PSU}$) amount ranges within the explicitly disclosed ranges are contemplated and within the scope of the present disclosure.

In some embodiments, recurring units ($R_{PPSU}$) are of formula (XII):

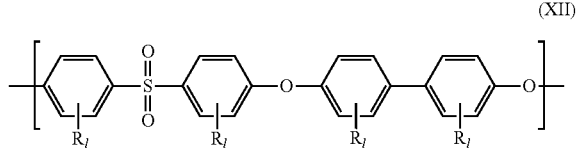

(XII)

In some embodiments, recurring units ($R_{PPSU}$) are of Formula (XI) or (XII), wherein each l=0.

The PPSU polymer of the present invention can be a homopolymer or a copolymer.

In some embodiments, the PPSU polymer is a copolymer and further comprise recurring units ($R_{PPSU}$*), distinct from recurring unit ($R_{PPSU}$), for example represented by a formula selected from the group of formulas consisting of Formulas (III) to (VIII).

In some embodiments, in which the PPSU polymer is a copolymer, the PPSU polymer can have at least about 1 mol. %, at least about 5 mol. %, or at least about 10 mol. % of recurring unit ($R_{PPSU}$*). In such embodiments, the PPSU polymer can have no more than about 50 mol %, no more than about 40 mol. %, no more than about 30 mol. %, or no more than 20 mol. % recurring unit ($R_{PPSU}$*). A person of ordinary skill in the art will recognize additional ranges within the explicitly disclosed ranges are contemplated and within the scope of the present disclosure.

The PPSU polymer can have a weight average molecular weight from about 20,000 g/mol to about 80,000 g/mol. A person of ordinary skill in the art will recognize that additional weight average molecular weight ranges within the explicitly disclosed ranges are contemplated and within the scope of the present disclosure.

In general, in embodiments in which the polymer compositions includes a PPSU polymer, it has been found that outstanding anti-stick properties are obtained when the PPSU polymer is present in an amount of at least 7 wt. %, at least 8 wt. %, at least 9 wt. %, or at least 10 wt. %. In some such embodiments, the PPSU polymer amount is no more than about 40 wt. %, no more than about 35 wt. %, no more than about 30 wt. %, no more than about 25 wt. % or no more than about 20 wt. %. A person of ordinary skill in the art will recognize additional PPSU amount ranges within the explicitly disclosed ranges are contemplated and within the scope of the present disclosure. In some embodiments in which the polymer composition includes a PPSU polymer, it was surprisingly found that outstanding anti-stick properties can be achieved with at least 5 wt. % of the PPSU polymer. In particular, it was surprisingly found that in embodiments in which the polymer compositions comprises a clay mineral filler, outstanding anti-stick properties were achieved with PPSU polymer amounts of less than about 5.5 wt. %, as demonstrated in the Examples below. In such embodiments, the PPSU polymer amount is more than about 1 wt. %. At the same time, the PPSU polymer amount is no more than about 40 wt. %, no more than about 35 wt. %, no more than about 30 wt. %, no more than about 25 wt. % or no more than about 20 wt. %.

Mixture of PSU and PPSU

In some embodiments, the polymer composition comprises both a PSU polymer and a PPSU polymer. In this case, the total amount of PSU and PPSU polymers can for example be more than about 1 wt. %, for example more than about 2 wt. % or more than about 5 wt. %. In some embodiments, the total amount of the PSU and PPSU polymer is no more than about 40 wt. %, no more than about 35 wt. % or no more than about 30 wt. %, no more than about 20 wt. %, no more than about 15 wt. % or no more than about 10 wt. %.

Additives

In some embodiments, the polymer composition can include one or more additives. Additives can include, but are not limited to, fillers, inorganic pigments, UV/light stabilizers, heat stabilizers, plasticizers, lubricants, processing aids, impact modifiers, flame retardants and antistatic agents.

In some embodiments, the polymer composition includes a filler other than an inorganic pigment. Desirable fillers include, but are not limited to, glass fibers, carbon fibers, graphite fibers, silicon carbide fibers, aramide fibers, wollastonite, talc, mica, titanium dioxide, potassium titanate, silica, kaolin, chalk, alumina, boron nitride, aluminum oxide. Fillers improve possibly notably mechanical strength (e.g. flexural modulus) and/or dimensional stability and/or friction and wear resistance. According to some embodiments, the polymer composition comprises a total filler amount of from about 1 wt. % to about 40 wt. %, from about 2 wt. % to about 30 wt. %, from about 3 wt. % to about 25 wt. %, or no more than about 20 wt. %. A person of ordinary skill in the art will recognize additional filler amounts within the explicitly disclosed ranges are contemplated and within the scope of the present disclosure.

A mentioned above, in some embodiments, a particularly desirable class of fillers include clay mineral fillers. In embodiments of the polymer composition including a PPSU polymer, it was surprisingly found that outstanding antistick properties could be achieved with reduced PPSU amount relative to corresponding polymer compositions free of a clay mineral filler. Clay mineral fillers include, but are not limited to, kaolin, mica and montmorillonite. Excellent results were obtained with kaolin. In embodiments including a clay mineral filler and a PPSU polymer, the polymer compositions can have a clay mineral filler amount of at least about 1 wt. %, at least about 5 wt. %, at least about 7 wt. %, at least about 8 wt. %, at least about 9 wt. % or at least about 10 wt. %. In such embodiments, the polymer composition can have a clay mineral filler amount of no more than about 40 wt. %, no more than about 30 wt. %, no more than about 20 wt. %, or no more than about 15 wt. %. A person of ordinary skill in the art will recognize that additional clay mineral filler amount ranges within the explicitly disclosed ranges is contemplated and within the scope of the present disclosure.

In some embodiments, the polymer composition can optionally include one or more inorganic pigments. In general, inorganic pigments are added to obtain a selected appearance of the polymer composition by changing the color of reflected or transmitted light as the result of wavelength-selective absorption. Desirable inorganic pigments include, but are not limited to, titanium dioxide, zinc sulfide, barium sulfate, carbon black, cobalt phosphate, cobalt titanate, cadmium sulfoselenide, cadmium selenide, copper phthalocyanine, ultramarine, ultramarine violet, zinc ferrite, magnesium ferrite, and iron oxides. The polymer compositions of interest herein can optionally comprise a total inorganic pigment amount of from about 0.1 wt. % to about 20 wt. %. A person of ordinary skill in the art will recognize additional pigment amounts within the explicitly disclosed ranges are contemplated and within the scope of the present disclosure.

Articles

As explained above, the polymer compositions of interest herein have outstanding anti-stick properties with respect to proteins. Accordingly, the polymer compositions described herein can be desirably incorporated into articles that have a plastic surface that come into direct contact with proteins. The article can have a plastic surface, at least a portion of which comes into contact with proteins in its intended application setting. The surface can be an external surface or an internal surface of the article. For example, a food bowl has an interior surface, at least a portion of which is intended to come into direct contact with proteins (e.g., food). As another example, a medical implant has an external surface that is intended to come into direct contact with proteins (e.g. from blood, plasma or serum). A person of ordinary skill in the art will know which surface is intended to contact a protein based upon the articles intended application setting. In some embodiments, the surface can comprise the polymer composition. For example, the polymer composition can form a portion of the surface or the polymer composition can form all, or substantially all, of the article. As another example, the surface can comprise a coating or film comprising the polymer composition, disposed on an underlying substrate. In such embodiments, the underlying substrate can be a structural component having a composition distinct from the polymer compositions forming the film or a coating. In embodiments in which the polymer composition is a film or coating, the film or coating can have an average thickness of from about 25 μm to about 1 mm.

In some embodiments, the polymer compositions can be desirably incorporated into articles such as food containers and utensils. Food refers to a substance that is intended and suitable for human or animal consumption. Such articles generally come into contact with food at relatively high temperatures during cooking, while serving, or in sterilization procedures (e.g. treated with hot steam to clean) and may become soiled with various substances, particularly with proteins, which cannot be desirably cleaned by washing under normal household conditions. Protein rich foods including, but not limited to, fried and scrambled eggs are particularly prone to sticking to food containers and utensils. The polymer compositions described herein can be desirably used in articles such as food containers and utensils to help reduce adhesion between the container/utensil and residual food. Food containers include, but are not limited to, food service trays, plates, bowls and cups, food storage containers, food cookware (e.g. pots, pans, mixing bowls, and casserole dishes) and the like. Food utensils include, but are not limited to, knives, forks, spoons, cooking utensils, serving utensils and the like.

In some embodiments, the polymer compositions described herein can be desirably incorporated into food containers or food utensils for on-board use in the airline industry. In such an application setting, a single container (e.g. a bowl) is often used to store food, heat food (generally at 200° C. or greater), and serve food. After use, the container sits in storage until the plane lands, at which time it is removed and transported for cleaning. Cleaning generally involves one or more cleaning processes where the container is subjected to harsh cleaning processes (about 80° C. or greater). All of the aforementioned steps can exacerbate or further contribute to undesirable soiling of the container. Furthermore, such repeated use cycles relatively quickly render the container undesirable for further use and the container must be replaced with a new one. Food containers and utensils comprising the polymer composition described herein can therefore have significant economic advantages at least by prolonging the life cycle of food containers, especially in light of the volume of food containers that are used each day in the airline industry. Additionally, in-flight service items on airplanes are heavily optimized for light weight and simultaneously requiring strengths. The polymer compositions described herein have excellent strength while remaining relatively light. The polymer compositions described herein can have a relative density of at least about 1.3 to about 1.6 (relative to $H_2O$ at standard temperature and pressure).

In some embodiments, the polymer compositions described herein can be desirably incorporated into medical articles used inside or outside the body. For example, with respect to implantable devices, the body, as part of its natural immune response, secrets proteins (e.g. collagen) onto the surface of an implanted object. As the protein deposit builds up on a surface of the implanted device, the build-up of material can undesirably compromise the function of the device over time, requiring the device to be replaced and exposing the patient to further medical procedures and increasing patient cost. As another example, surfaces of medical trays used in operating rooms are often exposed to body fluids from used instruments and the like. After use, the trays generally undergo a sterilization procedure so that they can be re-used. The sterilization procedure can involve at least cleaning the tray with a detergent and, furthermore, generally involves heating the tray at elevated temperatures. Accordingly, the polymer compositions described herein can be used to reduce the amount of cleaning or to further ensure the cleanliness of such trays over repeated use cycles. Regardless of the particular medical application, strength is generally required for proper function of the medical article. Furthermore, in certain medical application (e.g., implantable devices), light-weighting is also simultaneously desirable. Correspondingly, the polymer compositions described herein are highly desirable in medical application settings. Of course, the above equally applies to medical articles used to treat animals (e.g. veterinarian articles) for analogous reasons.

In some embodiments, the polymer compositions described herein can be desirably incorporated into medical articles including, but not limited to implantable cardioverter defibrillators, artificial hip joints, artificial knee joints, heart pacemakers, breast implants, spinal fusion hardware (including, but not limited to, artificial discs), intra-uterine devices, artificial knees, coronary stents, ear tubes, prostheses, artificial heart valves, implantable tubes (including, but not limited to, catheters), filtration membranes (including, but not limited to, hemodialysis membranes), surgical instruments (including, but not limited to, forceps, clamps, retractors, distractors, scalpels, surgical scissors, dilators, specula, suction tips, staplers, injection needles, drills, fiber optic instruments, and medical trays (including, but not limited to, sterilization trays).

The articles described herein can be formed using techniques well known in the art, including but not limited to, injection molding, blow molding, compression molding and any combination thereof.

Should the disclosure of any patents, patent applications, and publications which are incorporated herein by reference conflict with the description of the present application to the extent that it may render a term unclear, the present description shall take precedence.

EXAMPLES

The following Examples demonstrate the anti-sticking performance of the polymer compositions described herein.

To demonstrate performance, samples were formed using one or more following polymers:

Veradel® PES A 301 NT produced by Solvay Specialty Polymers U.S.A, L.L.C. ("M1");

Udel® PSU 1700 NT produced by Solvay Specialty Polymers U.S.A, L.L.C. ("M2");

Radel® PPSU R-5900 NT produced by Solvay Specialty Polymers U.S.A, L.L.C. ("M3");

Polymist® PTFE (polytetrafluoroethylene) F5A produced by Solvay Specialty Polymers Italy S. p. A;

Hyflon® MFA 840 (polytetrafluoroethylene perfluoro methylvinylether) produced by Solvay Specialty Polymers Italy S. p. A ("MFA"); and Ryton® PR37 PPS produced by Solvay Specialty Polymers U.S.A, L.L.C. ("PPS").

Furthermore, each sample optionally included one or more of the following:

$TiO_2$ used in the examples as a white pigment was supplied by Dupont Titanium Technologies® as titanium dioxide rutile R105;

Genioplast® Pellet S supplied by Wacker Chemie was used as silicone-based additive;

ZnO used in the examples as a stabilizer was supplied by Rhein Chemie Corporation, a Lanxess Company; and Kaolin obtained as Translink® HF9000 from BASF.

To form sample plaques for anti-stick testing, the polymer compositions were first extrusion blended and subsequently injection molded. For each sample, the polymer resins and kaolin were fed in the first barrel of a ZSK-26 twin-screw extruder having twelve zones via several weight and loss feeders. The remaining components were fed in barrel 7. The screw rate was 200 rpm. The barrel settings were in the range 340-360° C. The extrudates were cooled and pelletized using conventional equipment. The pellets were used to prepare small plaques of about 5 cm*7.6 cm*2.54 mm by injection molding.

To test anti-stick properties of the sample plaques, 5 milliliters ("mL") of raw scrambled egg (a very high protein food) was placed on the surface of each plaque. Each plaque was then heated to 200° C. for 30 minutes in an oven and, subsequently, removed and allowed to cool to room temperature. The plaques were then subjected to one or more cleaning processes to determine the anti-stick property of the plaque. A first cleaning treatment ("Treatment A") involved turning the plaque upside-down to remove the egg. A second treatment ("Treatment B") involved washing the plaque with cold, soapy water.

The anti-stick properties were rated by visual inspection as follows:

"++" indicates that no food stuck to the plaque after Treatment A ("no sticking");

"–" indicates that egg remains after Treatment A but not after Treatment B ("moderate sticking"); and "– –" indicates egg remains after Treatment A and Treatment B ("significant sticking"). The results are displayed in the following tables.

TABLE 1

| Exp. | PES (wt. %) | PSU (wt. %) | PPSU (wt. %) | $TiO_2$ (wt. %) | ZnO (wt. %) | Kaolin (wt. %) | FOOD sticking |
|---|---|---|---|---|---|---|---|
| C1 (comp) | 93.77 | — | — | 6 | 0.23 | — | – – |
| C2 (comp) | 92.77 | 1 | — | 6 | 0.23 | — | – |
| E1 | 91.77 | 2 | — | 6 | 0.23 | — | ++ |
| E2 | 88.77 | 5 | — | 6 | 0.23 | — | ++ |
| E3 | 78.77 | 5 | — | 6 | 0.23 | 10 | ++ |

TABLE 1-continued

| Exp. | PES (wt. %) | PSU (wt. %) | PPSU (wt. %) | TiO₂ (wt. %) | ZnO (wt. %) | Kaolin (wt. %) | FOOD sticking |
|---|---|---|---|---|---|---|---|
| E4 | 68.77 | 5 | — | 6 | 0.23 | 20 | ++ |
| E5 | 83.77 | — | 10 | 6 | 0.23 | — | ++ |
| C3 (comp) | 88.77 | — | 5 | 6 | 0.23 | — | -- |
| C4 (comp) | 83.8 | — | — | 6 | 0.2 | 10 | -- |
| C5 (comp) | 73.8 | — | — | 6 | 0.2 | 20 | -- |
| C6 (comp) | 63.8 | — | — | 6 | 0.2 | 30 | -- |
| E6 | 78.77 | — | 5 | 6 | 0.23 | 10 | ++ |
| E7 | 68.77 | — | 5 | 6 | 0.23 | 20 | ++ |
| E8 | 63.8 | 30 | — | 6 | 0.2 | — | ++ |
| E9 | 73.8 | 20 | — | 6 | 0.2 | — | ++ |
| E10 | 83.8 | 10 | — | 6 | 0.2 | — | ++ |
| E11 | 83.77 | 10 | — | 6 | 0.23 | — | ++ |

Referring to Table 1, samples E1-E5 and E6-E11 all had outstanding anti-stick properties. FIG. 1 is a photographic image of E8 (left panel) and C4 (right panel), showing the surface of each sample after Treatment A (E8) and after Treatment A and B (C4). Additionally, comparison of C1 with E1-E5 and E6-E11 demonstrate that the outstanding anti-stick properties are not achieved when the polymer composition does not include a PSU polymer or a PPSU polymer. Furthermore, comparison of C3 and with E5-E7 demonstrate that, for the samples tested, kaolin can be used to achieve outstanding anti-stick properties at lower PPSU amounts. In particular, C3 (5 wt. % PPSU, no kaolin) had significant sticking while E5 (10 wt. % PPSU, no kaolin), E6 (5 wt. % PPSU, 10 wt. kaolin) and E7 (5 wt. % PPSU, 20 wt. % kaolin) all had no sticking.

The results obtained for comparative compositions C7-C10 (containing fluorinated polymers) are summarized in the following Table 2 (comparative examples with fluorinated polymers)

TABLE 2

| Exp. | PES (wt. %) | TiO₂ (wt. %) | ZnO (wt. %) | MFA (wt. %) | PTFE (wt. %) | FOOD STICKING |
|---|---|---|---|---|---|---|
| C7 (comp) | 91.8 | 6 | 0.2 | — | 2 | -- |
| C8 (comp) | 88.8 | 6 | 0.2 | — | 5 | -- |
| C9 (comp) | 91.8 | 6 | 0.2 | 2 | — | -- |
| C10 (comp) | 88.8 | 6 | 0.2 | 5 | — | -- |

Referring to Table 2, the results demonstrate that, in the presence of more than 1 wt. % of a fluoropolymer (MFA or PTFE), the polymer composition shows significant sticking.

The unsatisfactory results obtained for comparative compositions C8 (containing a silicone additive instead of PSU/PPSU) and C11-C12 (containing PPS instead of PSU/PPSU) are summarized in the following Table 3 (comparative examples with polyphenylene sulphides or silicone additive)

TABLE 3

| Experiment | M1 | PPS | Silicone | TiO₂ | ZnO | FOOD STICKING |
|---|---|---|---|---|---|---|
| C11 (comp) | 91.8 | — | 2 | 6 | 0.2 | -- |
| C12 (comp) | 88.8 | 5 | — | 6 | 0.2 | -- |
| C13 (comp) | 83.8 | 10 | — | 6 | 0.2 | -- |

The compositions of examples E2 to E7, and E14 according to the invention were also submitted to a staining test using common condiments which are notorious for their staining effect on plastic surfaces. About 5 ml of ketchup, mustard and of a 50:50 in volume mixture of turmeric and corn oil were dropped on plaques made by injection molding (as described above). The condiments were left to dry at room temperature over a period of 72 hours. The plaques were then washed with cold water and mild soap, dried and their surface were visually inspected for stains. None of the plaques tested were stained.

The invention claimed is:

1. An article comprising a surface configured to contact a protein, the surface comprising a polymer composition, the polymer composition comprising:
   component (a): from about 50 wt. % to about 98.5 wt. % of a poly(ether sulfone), PES polymer (M1);
   component (b):
     from about 1 wt. % to about 40 wt. % of a polysulfone, PSU polymer (M2), or
     from about 1 wt. % to about 40 wt. % of a poly(phenyl ether sulfone), PPSU polymer (M3), or
     from about 1 wt. % to about 40 wt. % of a mixture of the PSU polymer (M2) and the PPSU polymer (M3);
   optionally from about 1 wt. % to about 40 wt. % of at least one clay mineral filler (F) wherein all the wt. % are relative to the total weight of the polymer composition and with the proviso that if the polymer composition comprises from about 1 wt. % to about 7 wt. % of the PPSU polymer (M3), the clay mineral filler (F) is present from at least about 7 wt. % to about 40 wt. %,
   wherein the PES polymer (M1) comprises at least 80 mol. % of recurring units ($R_{PES}$) of formula (II):

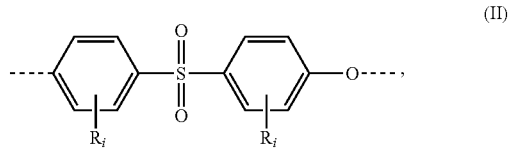

(II)

wherein:
   each $R_i$, equal to or different from each other, is selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium, and
   each i, equal to or different from each other, is an integer ranging from 0 to 4.

2. The article of claim 1, wherein the clay mineral filler (F) is kaolin or mica.

3. The article of claim 1, wherein the polymer composition is free of a polysulfone, PSU polymer (M2).

4. The article of claim 1, wherein the polymer composition comprises from about 67 wt. % to about 95 wt. % of component (a).

5. The article of claim 4 further comprising about 5 wt. % to about 10 wt. % of component (b).

6. The article of claim 1, wherein the surface comprises a substrate and a film or coating having an average thickness from about 25 μm to about 1 mm disposed on the substrate, and wherein the film or coating comprises the polymer composition.

7. The article of claim 1, wherein the article is selected from the group consisting of a food container, a food utensil, and a medical article.

8. The article of claim 1, wherein the PES polymer (M1) has a glass transition temperature of at least about 200° C., as measured by differential scanning calorimetry according to the ASTM D3418 standard.

9. A method for reducing sticking between the article of claim 1 and a protein, the method comprising forming at least a portion of the surface from the polymer composition.

10. A process for preparing the article of claim 1, the process comprising:
blending components (a) and (b), and optionally the clay mineral filler (F), and optionally other ingredients, and forming the surface comprising the polymer composition, or coating or laminating at least one different surface of the article with the polymer composition to form the surface comprising the polymer composition.

11. A polymer composition comprising:
component (a): from about 60 wt. % to about 98.5 wt. % of a poly(ether sulfone), PES polymer (M1);
component (b):
from about 1 wt. % to about 20 wt. % of a polysulfone, PSU polymer (M2), or
from about 1 wt. % to about 40 wt. % of a poly(phenyl ether sulfone), PPSU polymer (M3), or
from about 1 wt. % to about 40 wt. % of a mixture of the PSU polymer (M2) and the PPSU polymer (M3);
optionally from about 1 wt. % to about 40 wt. % of at least one clay mineral filler (F) wherein all the wt. % are relative to the total weight of the polymer composition and with the proviso that if the polymer composition comprises from about 1 wt. % to about 7 wt. % of the PPSU polymer (M3), the clay mineral filler (F) is present from at least about 7 wt. % to about 40 wt. %,
wherein the PES polymer (M1) comprises at least 80 mol. % of recurring units ($R_{PES}$) of formula (II):

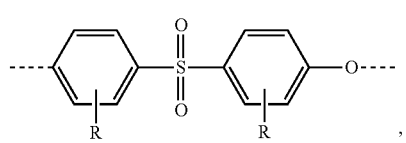

(II)

wherein:
each $R_i$, equal to or different from each other, is selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium, and
each i, equal to or different from each other, is an integer ranging from 0 to 4.

12. The polymer composition of claim 11, wherein the PSU polymer (M2) is of formula (X):

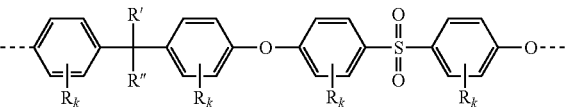

wherein:
each $R_k$, equal to or different from each other, is selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;
R' and R", equal to or different from each other, is selected from the group consisting of a hydrogen, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and
each k, equal to or different from each other, is an integer ranging from 0 to 4.

13. The polymer composition of claim 12, wherein each k=0, R' and R" are a methyl group, or both.

14. The polymer composition of claim 11, wherein the PPSU polymer (M3) is of formula (XII):

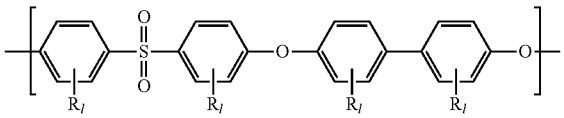

wherein:
each $R_l$, equal to or different from each other, is selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium, and
each l, equal to or different from each other, is an integer ranging from 0 to 4.

15. The polymer composition of claim 14, wherein each l=0, the mineral filler (F) comprises kaolin or mica, or both.

16. The polymer composition of claim 11, wherein the polymer composition comprises less than 0.1 wt. % of the PSU polymer (M2).

17. An article comprising a surface configured to contact a protein, the surface comprising the polymer composition of claim 11, wherein the article is selected from the group consisting of a food container, a food utensil, and a medical article.

* * * * *